(12) United States Patent
Campbell et al.

(10) Patent No.: US 11,155,908 B2
(45) Date of Patent: Oct. 26, 2021

(54) METHOD AND SYSTEM FOR USING AN IRREVERSIBLE THERMO-CHROMATIC INDICATOR FOR QUALITY ASSURANCE OF A PART SUBJECTED TO HEAT TREATING

(71) Applicant: FORD GLOBAL TECHNOLOGIES, LLC, Dearborn, MI (US)

(72) Inventors: Aindrea McKelvey Campbell, Beverly Hills, MI (US); Amanda Kay Freis, Ann Arbor, MI (US); Peter A. Friedman, Ann Arbor, MI (US); Rosa Lynda Nuno, Monroe, MI (US); S. George Luckey, Dearborn, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 1120 days.

(21) Appl. No.: 15/405,815

(22) Filed: Jan. 13, 2017

(65) Prior Publication Data
US 2017/0130308 A1 May 11, 2017

Related U.S. Application Data

(62) Division of application No. 13/928,580, filed on Jun. 27, 2013, now Pat. No. 9,567,660.

(51) Int. Cl.
*C22F 1/04* (2006.01)
*G01K 11/12* (2021.01)
(Continued)

(52) U.S. Cl.
CPC .............. *C22F 1/04* (2013.01); *G01K 11/12* (2013.01); *C21D 1/68* (2013.01); *C21D 11/00* (2013.01)

(58) Field of Classification Search
CPC ...................................................... C21D 9/006
See application file for complete search history.

(56) References Cited

U.S. PATENT DOCUMENTS 3,096,184 A 7/1963 Gallop
3,750,904 A 8/1973 Wisler
(Continued)

FOREIGN PATENT DOCUMENTS

CN 1665754 9/2005
CN 103158290 6/2013
(Continued)

OTHER PUBLICATIONS

Defense Quality and Standardization Office, Military Specification Heat Treatment of Aluminum Alloys, MIL-H-6088G, Apr. 1, 1991.
(Continued)

*Primary Examiner* — Christopher S Kessler
(74) *Attorney, Agent, or Firm* — Vincent Mastrogiacomo; Brooks Kushman P.C.

(57) ABSTRACT

A system and method of verifying that a part is heat treated to strengthen the part. The part is marked with a thermo-chromatic composition before heat treating. The part is then heat treated to strengthen the part and change the color of the thermo-chromatic composition to indicate successful completion of the heat treating process. A detector may act to prevent the inclusion of a non-heat treated part in an assembly by disabling an assembly tool. A controller may also provide data related to the completion of the heat treating process to be recorded in a database.

13 Claims, 3 Drawing Sheets

(51) Int. Cl.
*C21D 11/00* (2006.01)
*C21D 1/68* (2006.01)

(56) References Cited

U.S. PATENT DOCUMENTS

| | | | |
|---|---|---|---|
| 4,827,423 | A | 5/1989 | Beasley et al. |
| 5,583,178 | A | 12/1996 | Oxman et al. |
| 5,655,592 | A | 8/1997 | Sullivan |
| 5,728,241 | A | 3/1998 | Gupta et al. |
| 6,126,730 | A | 10/2000 | Yoshida et al. |
| 7,491,278 | B2 | 2/2009 | Kropfl |
| 8,057,884 | B2 | 11/2011 | Hauser et al. |
| 9,657,385 | B2 | 5/2017 | Choi et al. |
| 2002/0025490 | A1* | 2/2002 | Shchegolikhin ......... B41M 3/14 430/270.15 |
| 2005/0139686 | A1 | 6/2005 | Helmer et al. |
| 2005/0221514 | A1 | 10/2005 | Pasadyn et al. |
| 2006/0099423 | A1 | 5/2006 | Hauser et al. |
| 2007/0186417 | A1 | 8/2007 | Smyth |
| 2009/0272171 | A1 | 11/2009 | Golovashchenko |
| 2010/0107962 | A1 | 5/2010 | Ricard et al. |
| 2012/0237694 | A1 | 9/2012 | Lorentzen et al. |
| 2014/0236336 | A1 | 8/2014 | Irick et al. |

FOREIGN PATENT DOCUMENTS

| | | |
|---|---|---|
| EP | 1055919 | 11/2000 |
| JP | 63264683 | 11/1988 |
| KR | 20050119996 | 12/2005 |
| WO | 2008059242 | 5/2008 |
| WO | 2010032002 | 3/2010 |

OTHER PUBLICATIONS

Disclosed Anonymously, "Post-Forming Heat Treatment of Aluminum Panels for High Strength Applications", IP.com Prior Art Database Disclosure, Feb. 3, 2010, 1 page.

* cited by examiner

METHOD AND SYSTEM FOR USING AN IRREVERSIBLE THERMO-CHROMATIC INDICATOR FOR QUALITY ASSURANCE OF A PART SUBJECTED TO HEAT TREATING

CROSS-REFERENCE TO RELATED APPLICATIONS

This application is a division of U.S. application Ser. No. 13/928,580 filed Jun. 27, 2013, now U.S. Pat. No. 9,567,660 issued Feb. 14, 2017, the disclosure of which is hereby incorporated in its entirety by reference herein.

TECHNICAL FIELD

This disclosure is directed to a manufacturing system for parts that are formed, heat treated to increase yield strength, and assembled.

BACKGROUND

There is substantial interest in reducing the weight of parts used to manufacture vehicles such as automobiles, trucks, airplanes and boats for the purpose of improving fuel economy. One approach to reducing the weight of parts is to use light weight/high strength aluminum alloys to manufacture such parts.

The yield strength of parts made of supersaturated, heat treatable aluminum alloys may be increased by aging the parts over a substantial period of time. Waiting for natural aging to occur is generally not economically feasible in manufacturing processes due to the long period of time required, and further, will not result in the part reaching peak strength. Some parts are included in assemblies that are painted and baked in a paint oven, but the time and temperature of the paint bake oven may be inadequate to fully strengthen the parts.

Aging may be accelerated by heating the parts in a process referred to as "artificial aging." For example, parts made of AA6111 series aluminum in the T4 temper may be artificially aged by heating the parts and can result in a doubling of the yield strength of the parts. Typically, it is not possible to form a given part after artificial aging due to the associated increase in yield strength and decrease in formability. Hence, it is desirable to manufacture such parts by forming when the parts are in the more formable T4 temper and subsequently artificially aging the parts to achieve the desired strength. Furthermore, the parts when processed in this manner will have less elastic recovery after forming. Pre-forming operations may include drawing, stretching, piercing, trimming, bending, extruding, forging or hydro-forming operations.

One problem with artificial aging is that it is impossible to determine by visual inspection whether the parts were subjected to the artificial aging process. A tensile test may be used to verify the yield stress of a part but a tensile test is destructive to the part. While a time consuming and relatively expensive hardness test could be used to test for artificial aging, these types of hardness tests may not be an accurate predictor of yield stress.

Structural beams, such as pillars, roof rails, frame parts, and the like once assembled to a vehicle may also be located in inaccessible areas that cannot be readily checked for yield strength. The yield strength of such parts may be critical to vehicle durability and/or vehicle quality. If it is determined that such structural parts lack the specified strength characteristics after the fact, costly corrective actions would be required such as replacing the part or adding a strengthening patch.

This disclosure is directed to solving the above problems and other problems as summarized below.

SUMMARY

This disclosure provides a system and method for ensuring that parts are supplied to an assembly operation only after post forming heat treatment. A deposit of a heat sensitive ink is applied to the stamped or hydro-formed part after forming before the part has been heat treated. The heat sensitive ink irreversibly changes color during the heat treatment process to provide a visual indicator that the part was treated in the heat treatment process. A sensor or detector (such as an optical scanner, photo-detector, photo-cell, photoresistor, or video camera) is provided after the heat treatment process on the assembly line to verify the presence of the heat sensitive ink and the color of such heat sensitive ink. Any parts that lack the heat sensitive ink or parts that have heat sensitive ink in a color not indicative of experiencing the heat treatment process appropriately are rejected and removed from the assembly line or are otherwise prevented from advancing further in the assembly process.

According to one aspect of this disclosure, a method of manufacturing is provided that uses a part that is strengthened by heat treating. The method comprises forming the part and marking the part in a predetermined location with an irreversible thermo-chromatic composition. Next the part is heated to increase the strength of the part simultaneously changing the color of the thermo-chromatic composition. The color of the thermo-chromatic composition is detected after the heating step and a subsequent manufacturing process is controlled based upon the change in color of the thermo-chromatic composition.

According to other aspects of this disclosure, the irreversible thermo-chromatic composition may be a thermo-chromatic ink that changes color from white to a darker color, such as green or black. The step of forming the parts may include the step of stamping the parts in a sheet metal forming process. The step of marking the part may be accomplished by painting or marking with an atomizing or non-atomizing spray or contact or non-contact marker. Part marking is required in a location that is visible during the detecting step. The step of heating the part may be performed by heating the part to 170° C.-240° C. for more than 20 minutes.

The step of detecting the color of the thermo-chromatic composition may further comprise optically sensing the color of the paint with a machine vision detector that provides a signal to a controller of an assembly tool that operates on the part after the heating step. If the color of the thermo-chromatic composition has not changed or if the thermo-chromatic composition is not detected, the assembly tool is prevented from operating. The assembly tool may be, for example, a welder, a riveter, a fixture, or other tool. Alternatively, the machine vision detector may provide a signal to a data storage system that correlates the signal to an identification associated with the part and records that the color of the thermo-chromatic composition satisfactorily changed during the heating step.

According to another aspect of this disclosure as it relates to a manufacturing system, a post forming heat treatment system is disclosed for assuring part strengthening. The system includes an applicator for applying a thermo-chromatic composition to a predetermined location on the part. A heat treating oven that heats the part to a predetermined temperature for a predetermined time, wherein the heat treating oven changes the color of the thermo-chromatic composition from an as applied color to a heat changed color. A detector is directed toward the predetermined location that detects the presence of the thermo-chromatic composition and also detects whether the thermo-chromatic composition is the as applied color or the heat changed color. A controller receives a signal from the detector verifying that the thermo-chromatic composition is present and that the thermo-chromatic composition is the heat changed color.

According to other aspects of this disclosure as it relates to the manufacturing system, the system may further include a database for recording the signal from the detector and recording the signal in a field associated with a part identifier. The controller may be operatively connected to a machine that acts on the part after the heat treating oven. The machine may be prevented from operating if the signal from the detector is not received by the controller.

The system may alternatively include an apparatus for applying an applique that bears at least in part an irreversible thermo-chromatic composition to a predetermined location on the part. In the applique embodiment, a label or a hang tag is attached to the part instead of applying the thermo-chromatic ink or paint to the part directly.

The above aspects of this disclosure and other aspects will be described in greater detail below in the detailed description with reference to the attached drawings.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
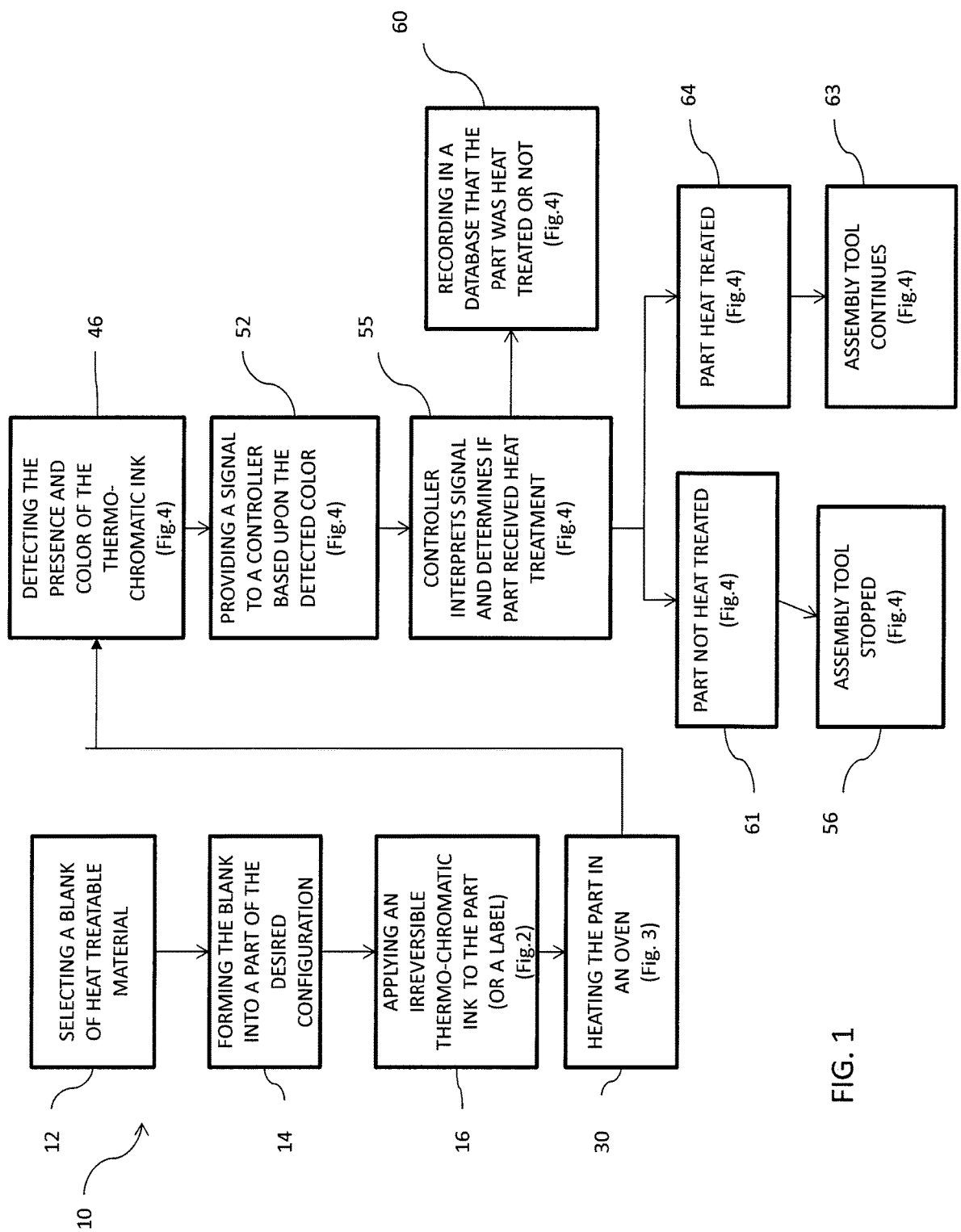
FIG. 1 is a flowchart of a method of heat treating a part using an irreversible thermo-chromatic indicator.

Referring to FIG. 1, a flowchart illustrates one embodiment of a method for heat treating aluminum using an irreversible thermo-chromatic indicator. The method begins by selecting a blank made of a heat treatable material at 12. Example materials include AA6xxx, AA2xxx, AA7xxx and some AA4xxx series aluminum alloys. Alternatively, other super saturated alloys with precipitate dispersion strength-ening mechanisms within the alloy may be used that are heat treatable to increase the tensile strength of the part.

The blank is formed in its pre-treatment stage (e.g., T4 for aluminum alloys). The part may be formed in a conventional sheet metal forming line and may include a drawing operation, flanging operation, piercing operation, hemming operation, and the like. Alternatively, the part may be formed at 14 in a hydro-forming operation. In either event, the material is easier to form the desired part before heat treatment because the material is more malleable.

Figure 2:
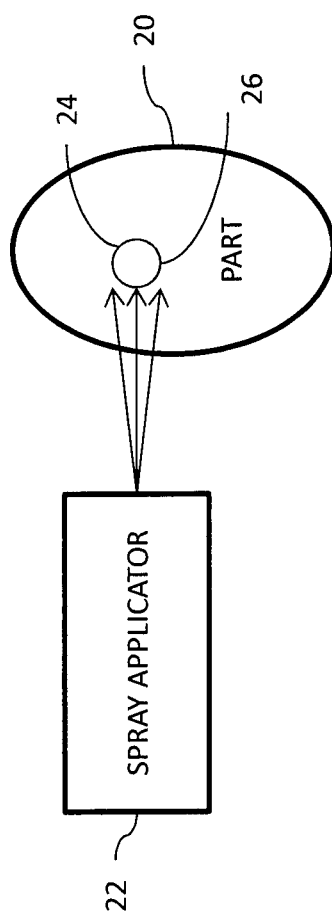
FIG. 2 is a diagrammatic representation of a spray applicator applying an irreversible thermo-chromatic ink to a part.

An irreversible thermo-chromatic ink is applied to the part at 16. The step of applying the thermo-chromatic ink is described with reference to FIG. 2. In FIG. 2, a part 20 is shown with a spray applicator 22. The spray applicator 22 is shown spraying a thermo-chromatic composition 24 in its original color to a predetermined area 26 of the part 20.

Alternatively, instead of applying paint to the part at 16, a hang tag, pressure sensitive label, or other applique that has a thermo-chromatic ink or paint may be attached to the part before the post forming heat treatment. The applique, hang tag, pressure sensitive label may be permanently attached to the part to prevent removal and must be heat resistant so that it is not harmed during the heat treatment process. The applique may be formed of or coated with a thermo-chromatic composition or otherwise bears the composition. The applique may be applied manually or with an attachment apparatus to a predetermined location on the part.

Figure 3:
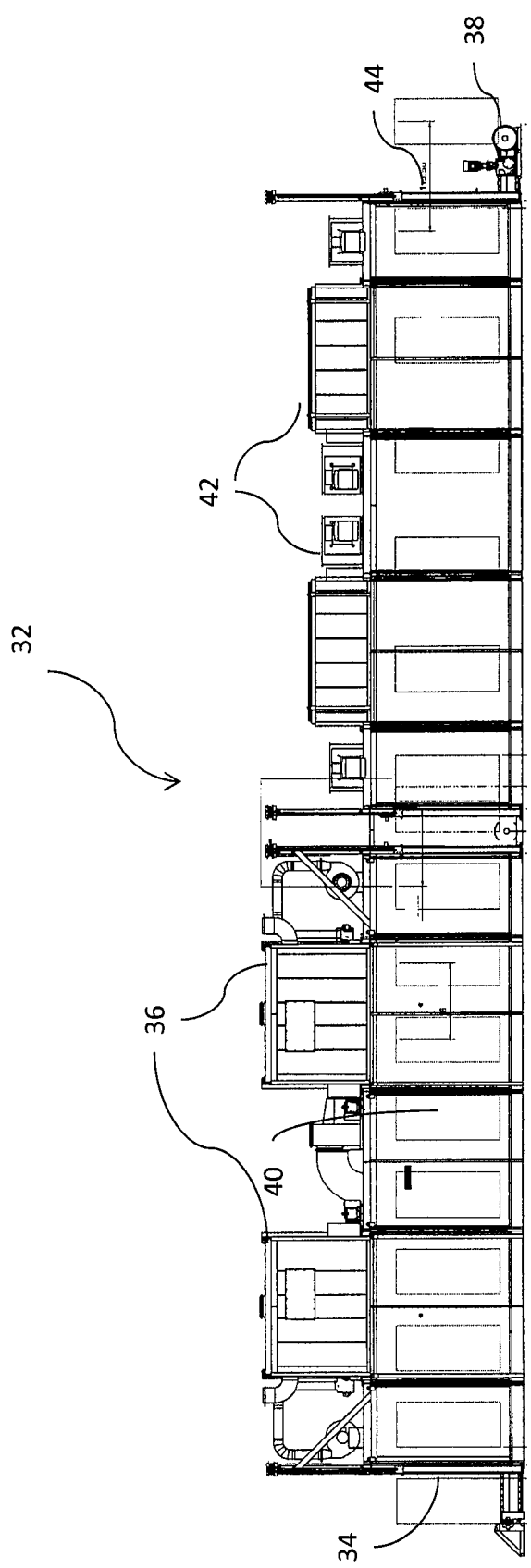
FIG. 3 is an off-line oven system for heat treating batches of parts.

Referring to FIGS. 1 and 3, the next step in the process is to heat the part in an oven at 30. Referring to FIG. 3, a high velocity batch convection oven is illustrated that is an off-line oven system 32. The off-line oven system 32 includes a loading station 34 that leads into the convection oven 36. A conveyor 38 moves a plurality of racks 40 sequentially through the convection ovens 36 and into cooling system cells 42. The racks 40 are loaded with parts 20 (shown in FIG. 2). The parts are heated to a temperature between 170° C. and 240° C. for a period of at least 20 minutes while they are in the convection ovens 36. A conveyor 38 moves the rack 40 through the convection ovens where they are heated and then moves the racks 40 through the cooling system cells 42 before being unloaded at the unloading station 44.

In one example, a part made of AA6111 had an initial yield stress of about 150 MPa as received. One set of parts were cycled through a paint bake operation and the yield strength increased to about 175 MPa. Another set of parts were subjected to heat treatment over a period of 0 to 100 minutes at a temperature of 225° C. without prior exposure through the paint bake cycle and achieved a yield stress of about 280 MPa after 20 minutes. The parts were strengthened by more than 100 MPa as a result of heat treating as compared to parts that are only heated in the course of the paint baking operation. Parts that were heat treated as received were strengthened by more than 115 MPa after 30 minutes.

Figure 4:
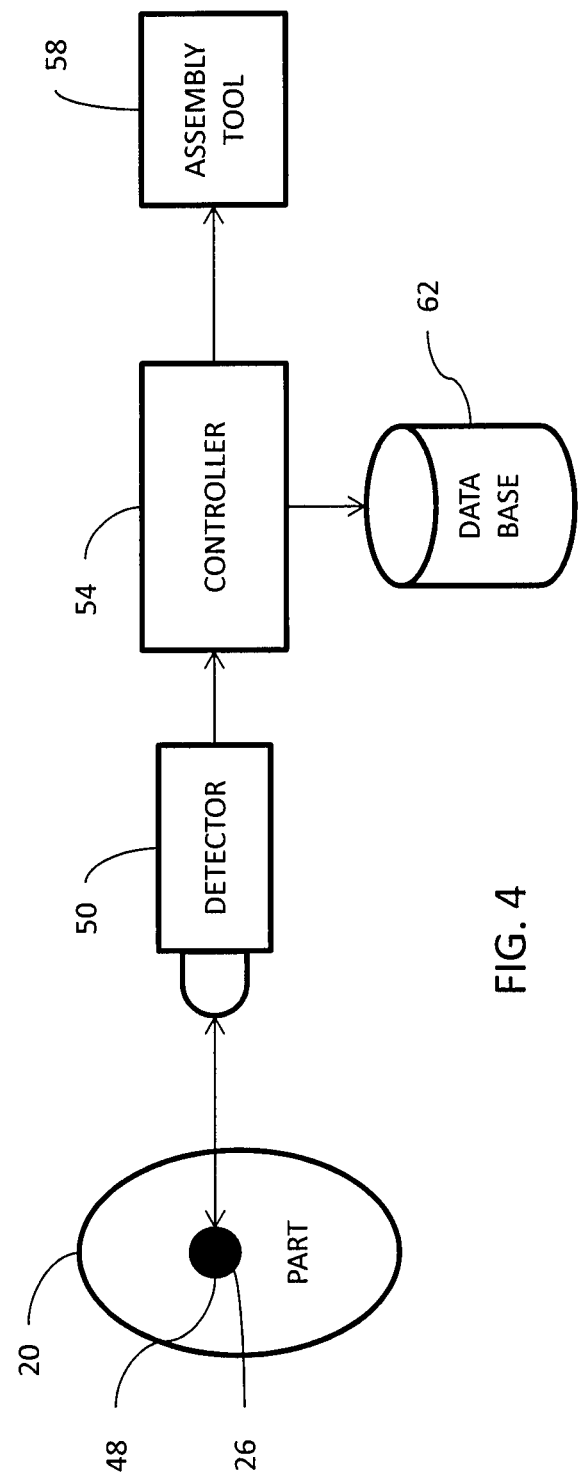
FIG. 4 is a diagrammatic representation of a detector for detecting the color of the irreversible thermo-chromatic ink and providing a signal to a controller that, in turn, interprets the significance of the color and whether heat treatment of the part occurred, and further, controls an assembly tool and provides data relating to verifying completion of the heat treating process that can be stored in a database.

Referring to FIGS. 1 and 4, the next step in the process is detecting the presence and color of the thermo-chromatic ink at 46. Referring to FIG. 4, the part 20 has a predetermined area 26 where the thermo-chromatic composition was applied in its as applied, or original, color 24, as described above with reference to FIG. 2. However, after passing through the off-line oven system 32, the thermo-chromatic composition has a heat changed color at 48. A detector 50, such as an optical scanner, photo-detector, photocell, photo resistor, or video camera is used to detect the heat changed color 48 on the part 20.

Referring to FIG. 1, the next step in the process is that the detector 50 (shown in FIG. 4) provides a signal to a controller based upon the detected color at 52. Referring again to FIG. 4, the detector 50 provides a signal to a controller 54. The controller 54 may be part of an assembly tool or may be a production control system for the line or for a plant. The controller is operatively connected to the assembly tool 58. The assembly tool 58 may be a weld gun, weld fixture, rivet tool, clinch tool, flow drill screwing tool, material handling tool, or other type of tool that acts upon the part 20 in a subsequent manufacturing operation. The controller interprets the signal and determines if the part was heat treated at 55.

As shown in FIG. 1, steps 61 and 64 illustrate the part as not heat treated and heat treated, respectively. The assembly tool 58 may be programmed to be disabled from operating on the part 20 if the detector 50 fails to detect the heat changed color 48 on the part 20. If the thermo-chromatic composition is in its original color, as indicated by reference numeral 24, or if the spray applicator 22 failed to apply the thermo-chromatic composition to the part 20, or if the irreversible thermo-chromatic composition is not the heat changed color 48, the controller 54 may lock out the assembly tool 58 from operating and prevent the inclusion of a part 20 that has not been subjected to the heat treating step for use in the assembly process (this is illustrated in FIG. 1 at step 56). Alternatively, if the part is satisfactorily heat treated the assembly tool may continue at step 63.

Referring to FIG. 1 step 60, the process may comprise recording in a database the fact that the part was heat treated. Referring to FIG. 4, a database 62 is shown to receive data from the controller 54. The database 62 may provide a record verifying that the parts 20 have been strengthened by processing through the off-line oven system 32.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A heat treatment system for assuring strengthening of a part comprising:
   an applicator tool for applying a thermo-chromatic composition to a predetermined location on the part;
   an oven that heats the part to a predetermined temperature for a predetermined time, wherein the oven changes the thermo-chromatic composition from an as applied color to a heat changed color;
   an optical color detector apparatus directed toward the predetermined location that detects a presence of the thermo-chromatic composition and also detects whether the thermo-chromatic composition is the as applied color or the heat changed color; and
   a machine controller receives a signal from the optical color detector apparatus if the thermo-chromatic composition is present and whether the thermo-chromatic composition is the heat changed color.

2. The system of claim 1 further comprising:
   a computer database system for recording the signal from the optical color detector apparatus and recording the signal in a field associated with a part identifier.

3. The system of claim 1 wherein the machine controller is operatively connected to a machine that acts on the part after the oven, and wherein the machine is prevented from operating if the signal from the optical color detector apparatus is not received by the machine controller.

4. The system of claim 1 wherein the thermo-chromatic composition is a thermo-chromatic ink that changes color from white to a darker color.

5. The system of claim 1 wherein the applicator tool applies the thermo-chromatic composition to the part by spraying the thermo-chromatic composition on the part in a location that is accessible to the optical color detector apparatus.

6. The system of claim 1 wherein the oven exposes the part to 170° C.-240° C. for more than 20 minutes.

7. A heat treatment system for assuring strengthening of a part comprising:
   a tool that attaches an applique that bears at least in part a thermo-chromatic composition to a predetermined location on the part;
   an oven that heats the part to a predetermined temperature for a predetermined time, wherein the oven changes the thermo-chromatic composition from an as applied color to a heat changed color;
   an optical color detector apparatus directed toward the predetermined location that detects a presence of the thermo-chromatic composition and also detects whether the thermo-chromatic composition is the as applied color or the heat changed color; and
   a machine controller receives a signal from the optical color detector apparatus if the thermo-chromatic composition is present and whether the thermo-chromatic composition is the heat changed color.

8. A heat treatment system for assuring strengthening of a part comprising:
   applicator means for applying an irreversible thermo-chromatic composition to a predetermined location on the part;
   oven means for heat treating that heats the part to a predetermined temperature for a predetermined time changes the thermo-chromatic composition from an as applied color to a heat changed color;
   detector means for detecting a color of a thermo-chromatic composition directed toward the predetermined location; and
   controller means for receiving a signal from the detector means if the thermo-chromatic composition is present and whether the thermo-chromatic composition is the heat changed color.

9. The system of claim 8 further comprising:
   a computer database system for recording the signal from the detector means for detecting color and recording the signal in a field associated with a part identifier.

10. The system of claim 8 wherein the controller means is operatively connected to a machine that acts on the part after the oven means, and wherein the machine is prevented from operating if the signal from the detector means for detecting color is not received by the controller means.

11. The system of claim 8 wherein the thermo-chromatic composition is a thermo-chromatic ink that changes color from white to a darker color.

12. The system of claim 8 wherein the applicator means applies the thermo-chromatic composition to the part by spraying the thermo-chromatic composition on the part in a location that is accessible to the detector means.

13. The system of claim 8 wherein the oven means exposes the part to 170° C.-240° C. for more than 20 minutes.

* * * * *